July 3, 1951     L. DOHMEYER     2,559,409
LIVE BAIT HOOK
Filed Oct. 30, 1946
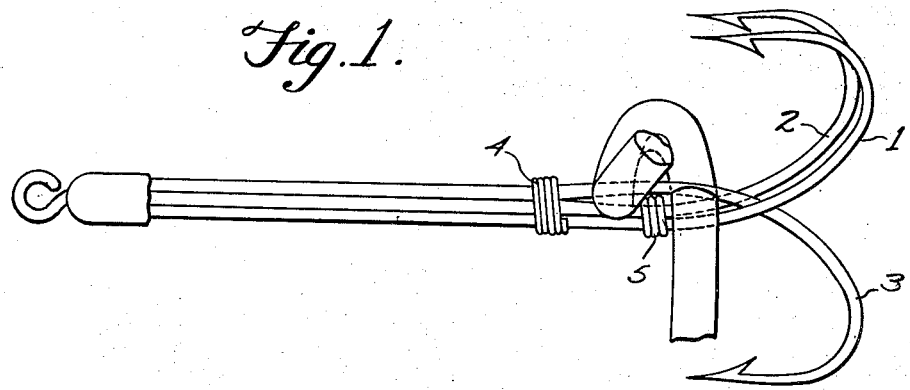
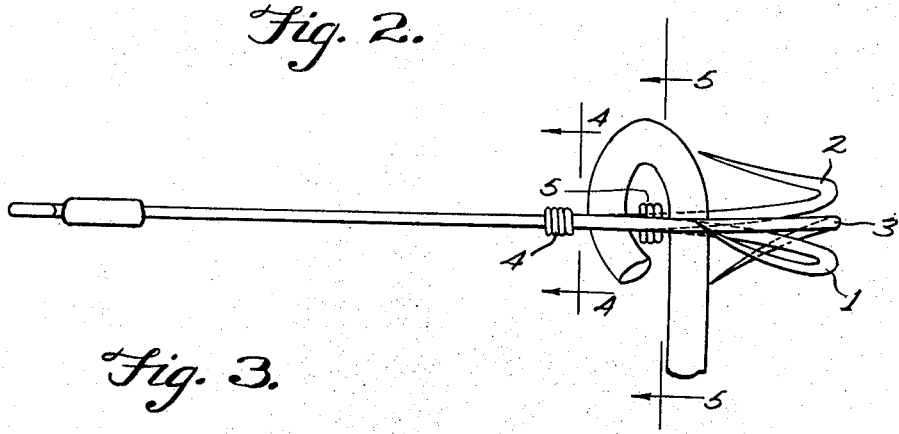
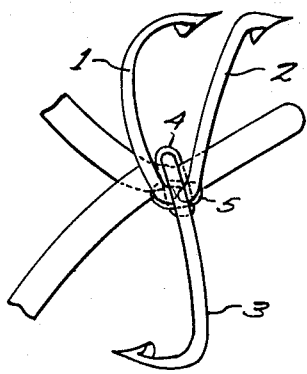
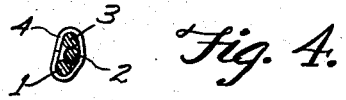
INVENTOR.
Louis Dohmeyer,
BY Victor J. Evans & Co.
ATTORNEYS Patented July 3, 1951

2,559,409

UNITED STATES PATENT OFFICE 2,559,409

LIVE BAIT HOOK

Louis Dohmeyer, Harvey, Ill.

Application October 30, 1946, Serial No. 706,773

2 Claims. (Cl. 43—44.8)

This invention relates to improvements in fish hooks, and more particularly to the provision of hooks which enable live bait to be effectively used.

In fishing it is desirable that live bait be held in such a manner as not to injure the bait so that the latter will have animation and better attract fish.

It is, therefore, an object of this invention to provide an arrangement of fish hooks in which live bait can be held between the hooks without injury to the bait.

A further object is the provision of a fish hook arrangement for holding live bait without injury, which arrangement can be easily adjusted to receive live bait of different sizes.

These and other objects are attained by the novel arrangement and construction hereinafter described and illustrated by the accompanying drawings, forming a part hereof and in which:

Fig. 1 a plan view of an arrangement of fish hooks for holding live bait.

Fig. 2 is a side view of the fish hook arrangement.

Fig. 3 is an end view of the arrangement of hooks.

Figs. 4 and 5 are sectional views taken on the lines 4—4 and 5—5, respectively, of Fig. 2.

Referring to the drawings, the fish hook device is shown to comprise three units 1, 2, 3, two of the units, 1 and 2, being alongside of each other and facing in the same direction, while the other unit 3 faces in an opposite direction, as shown in the drawings.

A movable sleeve 4 is fastened around all three of the units; and another movable sleeve 5 is fastened around only units 1 and 2. These sleeves can be moved up and down on the units so that they can be adjusted to accommodate different sizes and kinds of bait.

It will be seen that there has been provided a simple and effective fish hook arrangement for holding all kinds of live bait. The device has been tried out successfully using night crawlers, minnows, crabs, frogs, garden and grub worms, grasshoppers, and the like. The units can be provided in various sizes to accommodate different fishing conditions.

The sleeves 4 and 5 may comprise preformed sleeves or they may be formed by winding several turns of wire about the units to form a sleeve.

The units are all joined together at one end to a leader attachment.

In the drawings, a live bait such as a worm is shown to be positioned between the units 1 and 2 and the unit 3.

The above description is to be considered as illustrative and not limitative of the invention of which modifications can be made without departing from the spirit and scope of the invention as set forth in the appended claims.

The invention having been described, what is claimed is:

1. In a fishing device for holding live bait, a pair of fish hooks arranged along side each other and facing in the same direction, a third hook facing in the opposite direction intermediate of said first pair of hooks, the three hooks being joined at one end to a leader attachment, a link encircling and slidable on the pair of hooks to permit varying of the distance separating them, and a link encircling and slidable on all three hooks to permit varying the distance between said pair of hooks and the third hook to retain said live bait intermediate said hooks and said sleeves.

2. A fish hook comprising three units having an eye at the upper end, each having a shank and a hook, two of said units having their shanks arranged in parallel relation and the third unit having the upper portion of the curved portion of the hook located between the curved portions of said two units, the lower portion of the shank of said third unit being curved to provide in cooperation with the lower shank portions of said two units a clamp for bait, a sleeve surrounding the shanks of all the units and adapted to hold the curved shank portion of said third unit in bait clamping position with relation to the lower shank portions of said two units, and a second sleeve surrounding the lower shank portions of said two units to hold them in clamping relation, said second sleeve being located below said first sleeve when the bait is clamped between the sleeves.

LOUIS DOHMEYER.

REFERENCES CITED

The following references are of record in the file of this patent:

UNITED STATES PATENTS

| Number | Name | Date |
| --- | --- | --- |
| 5,256 | Johnson | Aug. 21, 1847 |
| 387,015 | Smith | July 31, 1888 |
| 1,215,697 | Paulsen | Feb. 13, 1917 |
| 1,323,394 | Jones | Dec. 2, 1919 |
| 1,730,957 | Valiga | Oct. 8, 1929 |
| 2,150,874 | Wagner | Mar. 14, 1939 |